Oct. 8, 1957   G. C. SULLIVAN   2,808,624
PANELS AND CONNECTOR THEREFOR
Filed Oct. 28, 1950   3 Sheets-Sheet 1
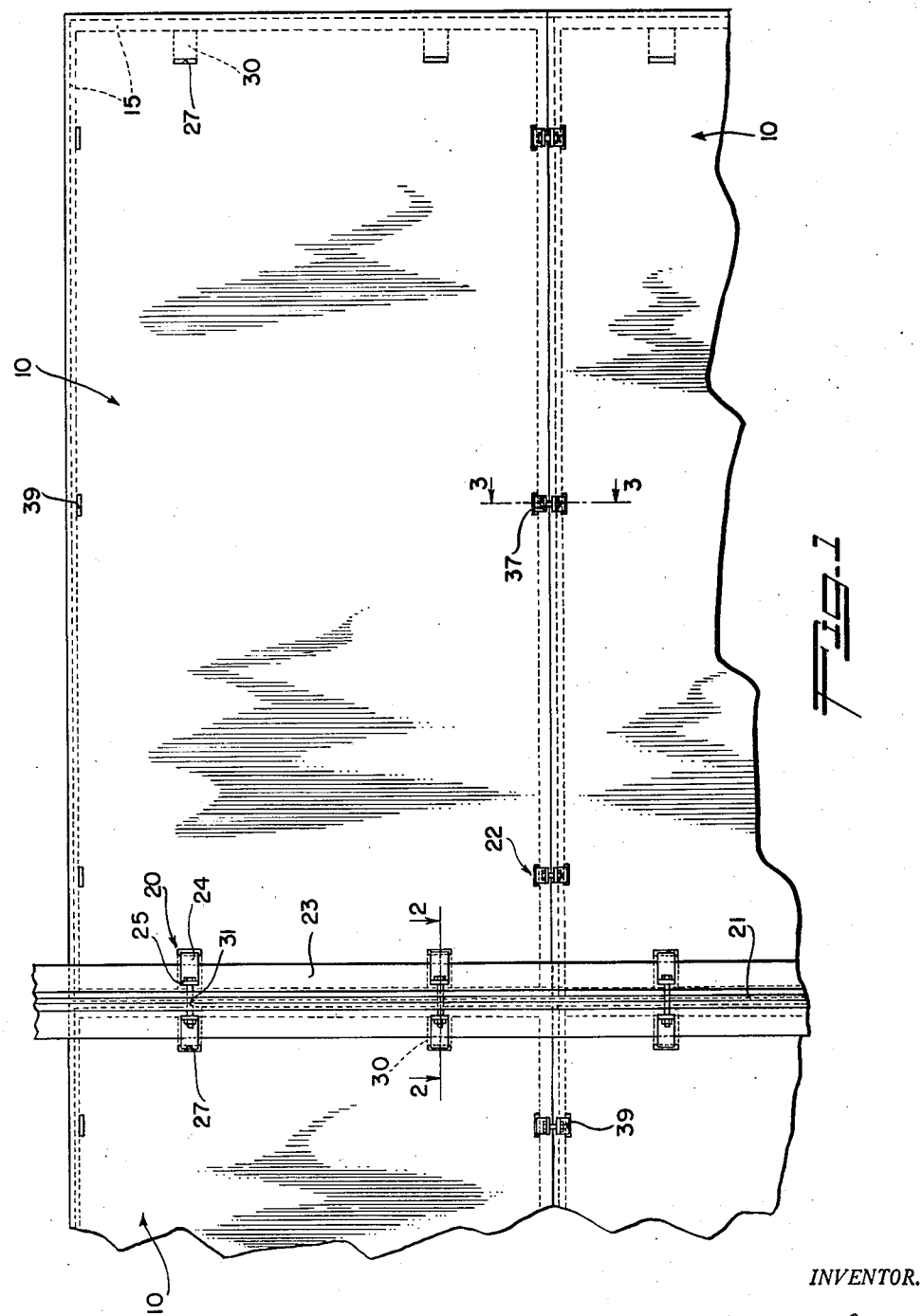
INVENTOR.
George C. Sullivan

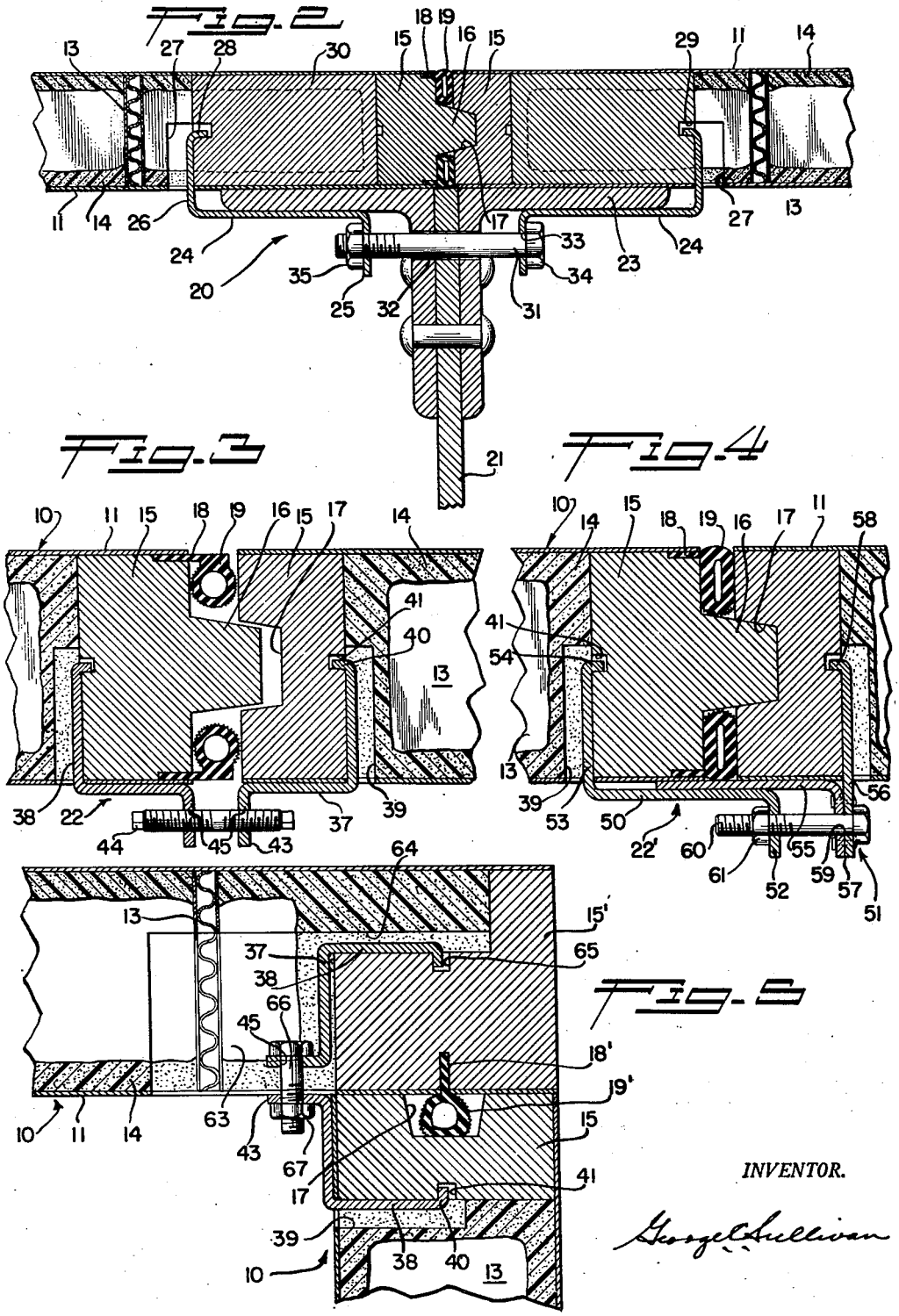

Oct. 8, 1957  G. C. SULLIVAN  2,808,624
PANELS AND CONNECTOR THEREFOR
Filed Oct. 28, 1950  3 Sheets-Sheet 3
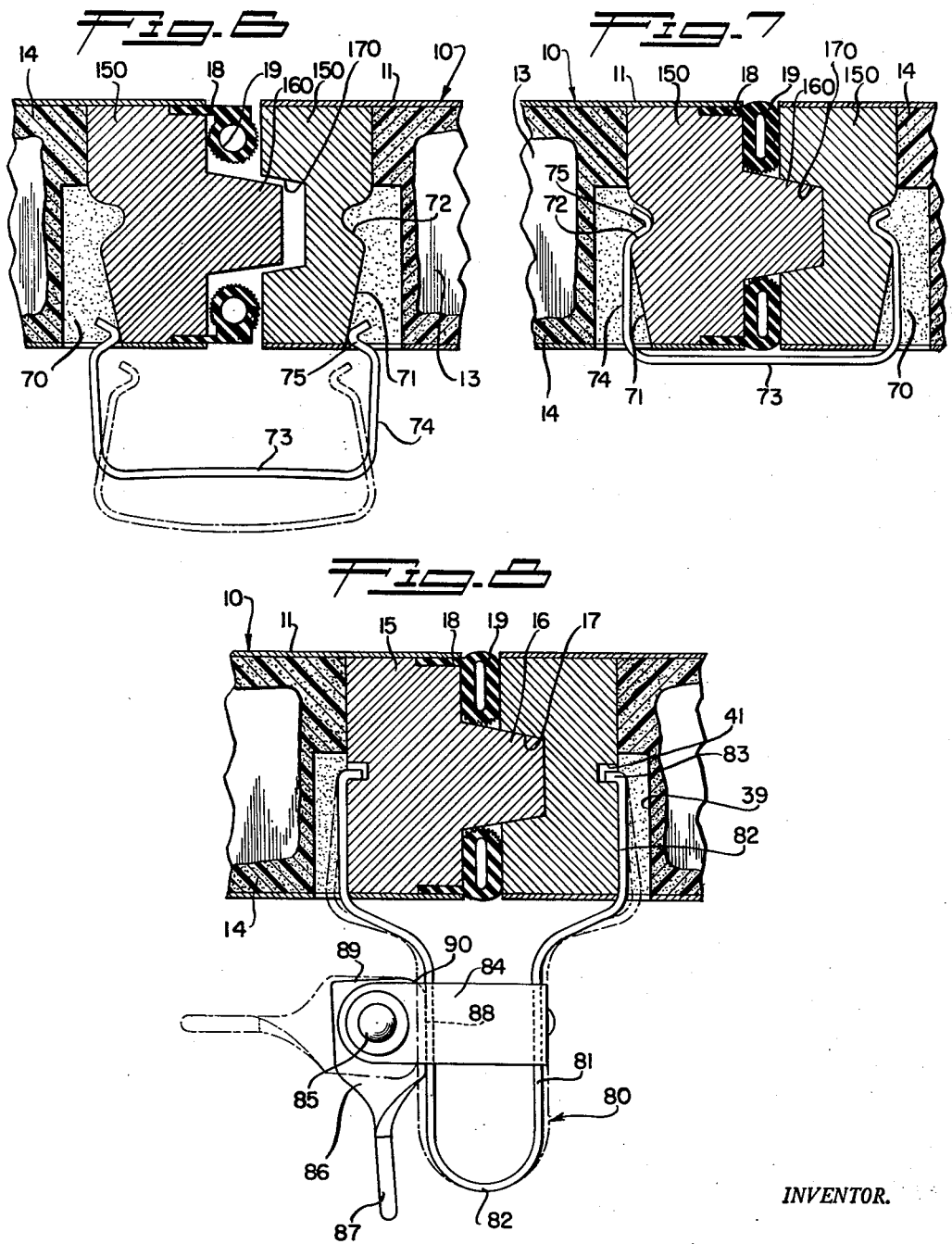
INVENTOR.
George C. Sullivan

United States Patent Office 2,808,624
Patented Oct. 8, 1957

2,808,624

PANELS AND CONNECTOR THEREFOR

George C. Sullivan, Hollywood, Calif., assignor to Lockheed Aircraft Corporation, Burbank, Calif.

Application October 28, 1950, Serial No. 192,798

9 Claims. (Cl. 20—15)

This invention relates to the building and construction fields and relates more particularly to assemblies of panels, sheets, slabs, blocks, tiles, and the like, suitable for incorporation in buildings and structures of other kinds. It is a general object of the invention to provide an assembly or an arrangement of two or more panels, or the like, characterized by simple, practical and effective means for securing the same together and/or to a supporting frame, structure, or the like.

Building panels in the form of laminates, and the like, are now utilized to a considerable extent in the building industry. However, their wide-spread adoption has been retarded to an appreciable degree by the inconvenience and difficulty of securing the panels one to the other in tight, sealed, mutual engagement, and in attaching them to the framework of the building or other structure. The problem of connecting and securing such panels in the so-called prefabricated buildings, is a serious one which, to the best of my knowledge, has not been satisfactorily solved.

It is, therefore, an important object of the present invention to provide an assembly of prefabricated panels wherein the panels are easily and quickly secured one to the other and/or to frame members, or the like. In accordance with the invention the panels are arranged in edge-to-edge relation, preferably with tongue and groove engagement or other mutually interlocking engagement at their margins, and are then drawn together and securely connected by spaced clamp or clip means. The clamp or clip means, several embodiments or forms of which are contemplated by the invention, are quickly assembled and actuated to securely join the panels in a manner to withstand appreciable loading and yet may readily be released and detached to permit disassembling of the panels if and when desired.

It is another object of the invention to provide panel assemblies of this character in which the clamp or clip means for securing the panels together in edge-to-edge relation also effectively urge the panels against the supporting structure or frame and dependably secure the panels to the frame. Where the panel joints coincide with or are substantially aligned with members of the frame, or other supporting structure, the clamp or clip means rigidly and dependably attach the panel assembly to the frame and urge and hold the panels securely against the frame members.

Another object of the invention is to provide a panel assembly and attaching means of the class above mentioned wherein the abutting or adjoined margins of the adjacent panels need not accurately coincide or align with the supporting frame members, the panel joining and attaching clamp means of the invention being of the "floating" type to allow for such misalignment and yet rigidly and dependably secure the assembled panels to the frame. This materially facilitates the assembling and erection of the structure, permitting a considerable lattitude in unavoidable inaccuracies of construction.

A further object of the invention is to provide an assembly of the class mentioned that may easily and quickly assembled and disassembled by unskilled labor and with a minimum of tools and equipment. Certain of the panel connecting clip or clamp means of the invention are actuated or tightened by simple wrenches, or the like, and in other embodiments are applied by hammers, or mallets, the arrangement in each case being such that the clamps are readily accessible for easy installation and quick detachment.

A still further object of the invention is to provide panel assemblies of this type in which the panels are designed and constructed to be readily assembled and secured in the desired relation and sealed against fluid leakage and the transmission of heat, there being fluid-tight seals at the panel joints and the joints having low thermal and acoustical transmission characteristics.

Other objectives and features of the invention will become apparent from the following detailed description of several typical preferred embodiments wherein reference will be made to the accompanying drawings in which:

Figure 1 is a fragmentary plan or elevation view of an assembly of several panels and a portion of a supporting frame member;

Figure 2 is an enlarged fragmentary sectional view taken as indicated by line 2—2 on Figure 1;

Figure 3 is an enlarged fragmentary sectional view taken as indicated by line 3—3 on Figure 1;

Figure 4 is a view similar to Figure 3 illustrating another form of clip or clamp means of the invention;

Figure 5 is an enlarged fragmentary sectional view of assembled and connected panels arranged in angular relation;

Figure 6 is a fragmentary sectional view illustrating another form of clamp or clip means of the invention in position to be installed on the panel assembly;

Figure 7 is a view similar to Figure 6 showing the clip or clamp in the installed or operative position; and Figure 8 is a fragmentary sectional view illustrating still another embodiment of panel securing clip or clamp means.

In the drawings I have shown the invention embodied in several forms and arrangements incorporating building panels of the general type described and claimed in my copending application, Serial No. 173,998 filed July 15, 1950, now abandoned, it being understood that building panel, slabs, tiles, etc. of other types may be employed. Accordingly, the invention is not to be construed as limited or restricted to the employment or incorporation of this particular form or class of panel.

The panels 10 may be flat, elongate sheet-like parts, as illustrated, or may be of any other shape or proportions. In Figure 1, I have shown several of the panels 10 arranged in edge-to-edge relation in the manner in which they may be used in external walls, roofs, partitions, ceilings, floors, etc. While the panels 10 are shown occupying a common plane, it is to be understood that adjacent or connected panels 10 may be in various angular relations, for example they may extend at right angles to one another or occupy planes at lesser angles. Each panel 10 includes two spaced parallel sheets of metal, wood, plywood, plastic, or combinations of such materials, which I will term the skins 11. The skins 11 may preferably be continuous and imperforate, although they may be interrupted by window openings, louvre openings, doorway openings, etc. as conditions require. Each panel 10 further includes an internal filler or lamination which may be a reticulated assembly of interfitting or interlocking strips 13 assembled and related to define substantially suitable air spaces. These strips 13 may be constructed of wood, metal, plastic, impregnated fabric, cardboard, or combinations of such materials. In the particular panels 10 illustrated, the strips 13 are constructed of corrugated cardboard faced on each side with sheets of paper or cardboard, and this type of reticulated cardboard structure is a common readily available product in the packaging industry. When formed of cardboard, wood, or the like, the strips 13 are preferably coated or impregnated with a laminating-type resin such as phenolic, or the like, to eliminate or reduce moisture penetration and absorption. It is to be understood that the invention is not confined to the use of an internal filler of the type just described and a honey-comb type filler, a corrugated filler, or the like, may be employed, if desired, as the filler laminations per se of the panels 10 do not alter the other elements, features, or objectives of the invention. The filler lamination made of the strips 13 is arranged so that the edges of the strips engage the inner surfaces of the skins 11 with the strips operating under compression to hold the skins 11 apart in parallel relation and to assume transverse loading on the panels 10.

The panels 10 further include laminations 14 on the inner surfaces of the skins 11. It is preferred that the laminations 14 be in the nature of layers of foamed or cellular plastic and it is preferred that these laminations cover the entire inner surfaces of the skins except, of course, where the strips 13, or other parts, directly contact the surfaces of the skins. The thicknesses of the laminations 14 may be varied to adapt the building units or panels for different uses or applications, particularly in instances where the insulative value ("U" factor) of the panel is of importance. In most instances, it is preferred to form the laminations 14 of a low density, high strength, foamed or cellular plastic. The laminations 14 may be of a cellular polyester plastic, a cellular phenolic resin plastic, a cellular Lucite, or the like, in which sodium bicarbonate, or other blowing or foaming agent, is employed to obtain the cellular structure and where one or more catalysts are employed in the resin formulations or mixture. With certain materials, a suitable post-curing at selected temperatures may be employed to obtain the required reaction, decomposition, or polymerization following the foaming action. Such resins, plastics, or mixtures, may be applied to the surfaces of the skins 11 by brushing, troweling, or other means to obtain good uniform adherence when the materials set and harden. As an example, I have found it desirable to employ the reaction product of an alkyd-resin polyisocyanate mixture which may or may not incorporate fillers, fire retardants, and the like, as the material of the laminations 14. Relatively thin coverings of such a reactant mixture applied to the inner surfaces of the skins 11 react or foam up at room pressure and temperature to embed and bond with the marginal portions of the strips 13 and to permanently and securely adhere to both the strips and the skins 11. A post-curing of this type of cellular plastic material at a moderate temperature serves to increase the physical properties of the cellular plastic however with various formulations of this class of cellular plastic no post heat curing is required. Alkyd-resin meta-toluene diisocyanate reactant mixtures such as the types described and claimed in the applications of Eli Simon and Frank W. Thomas, Serial Nos. 35,294 filed June 25, 1948 now Patent No. 2,577,279, 44,993 filed August 18, 1948 and 77,058 filed February 17, 1949, now Patent No. 2,591,884, are suitable for the laminations 14. The present invention is not directly concerned with the specific formulations of the materials or mixtures of which the laminations 14 are formed. However, it is desirable to form the laminations 14 of a low-density cellular material having a density of between 2 and 20 pounds per cubic foot, having excellent thermal and acoustical insulating properties, and good physical strength characteristics. The adhesion obtained by the laminations 14 and their extensive embedding of the edge portions of the strips 13 results in strong panels wherein the internal filler means or strips 13 and the outer skins 11 are securely, uniformly, and permanently bonded together.

The panels 10 further include marginal or edge strips or members 15 of wood, metal, or the like. These members 15 are secured between the skins 11 and preferably extend along substantially the entire margins of the panels. It is preferred to construct the members 15 of a hard wood, such as maple, although, of course, other materials may be employed. These frame-like members 15 are rigidly and permanently secured to the skins 11 and a suitable adhesive, of which there are many on the market, or the material of the laminations 14 may be used for this purpose, it being desirable to employ a moisture-proof or resistant adhesive. If metal edge strips are used, the same may be secured by means of rivets or spotwelds. As illustrated in the drawings, the material of the laminations 14 may directly engage and adhere to the inner surfaces of the members 15. The panels 10 are preferably constructed and related so that their edge members 15 have tongue and groove engagement or other form of lapped or overlapping engagement. For example, one end member 15 and one side member 15 of each panel 10 may have a tongue 16 and the other end member 15 and the other side member 15 of each panel may have a groove 17. The tongues and grooves 16 and 17 preferably extend throughout the entire length of the members 15 and, as illustrated, the tongues may have tapered or outwardly convergent side surfaces to cooperate with correspondingly tapered walls of the grooves 17, although the specific configuration of these parts is capable of considerable variation. The tongues 16 are of greater depth than the grooves 17, that is the tongues extend outwardly beyond the mouths of their mating grooves when the tongues are fully nested or seated in the grooves. This relationship spaces apart the opposing members 15 of the adjacent panels 10 when the panels are fully assembled.

The invention provides means for sealing the joints between the adjacent panels 10 against the entrance or leakage of fluid. These means include sealing strips 18 of rubber, synthetic rubber, rubber composition, felt, impregnated felt, or the like, recessed in the faces of the edge members 15 and secured between the members and the skins 11 by cement, or the like. While the sealing strips 18 may be arranged in various positions, it has been found desirable to arrange the strips adjacent the bases of the tongues 16 and to omit the strips from the faces of the members 15 which have the grooves 17, so that two edge members 15 of each panel 10 have sealing strips and the other two edge members of each panel are devoid of the sealing strips. Each sealing strip 18 has a tubular or hollow bead 19 capable of considerable deformation or compression when the panels 10 are assembled. Figure 3 illustrates the beads 19 prior to the full assembling or engagement of the panels 10 and Figure 2 illustrates the beads 19 in the compressed or deformed condition with the adjacent panels 10 completely assembled and connected. The parts are related and proportioned so that the beads 19 are compressed and elongated transversely of the panels 10 to maintain positive effective sealing engagement with substantial areas of the edge members 15 when the panels 10 are assembled and secured together. This is illustrated in Figures 2 and 4 of the drawings.

The invention provides clip or clamp means 20 for securing the edges of the adjacent panels 10 together and to supporting frame elements or members 21 of the building, or other structure and clip or clamp means 22 for securing the edges of the adjacent panels 10 together in the areas or regions between the frame members 21 as well as at other points. Figure 2 illustrates one of the means 20 while Figure 3 illustrates one form or embodiment of the means 22. In Figure 1, there is shown a typical arrangement where a plurality of the panels 10 are positioned and assembled to have their ends secured together at a frame member 21 of a building, partition, roof, or the like. The particular frame member 21 illustrated in Figures 1 and 2 is provided with two angles or flanges 23 and the panels 10 are positioned to have their inner skins 11 directly engage the outer faces of these flanges.

Each of the above mentioned means 20 includes two clamps 24 adapted to be arranged at or against the inner faces of the flanges 23. The clamps 24 are positioned at opposite sides of the frame member 21 and each has an ear or lug 25 at its inner end projecting substantially parallel with the frame member 21. Each clamp 24 also has at its outer end an arm 26 turned outwardly, that is toward the panel assembly. The skins 11, laminations 14 and, if necessary, the internal strips 13, have cut-outs or slots 27 for receiving these clamp arms 26. The extremities of the arms 26 have fingers 28 bent back or projecting substantially parallel with the plane occupied by the panels 10. It is preferred to shape and proportion the clamps 24 so that the fingers 28 are in or adjacent the central longitudinal or major plane of the panels 10. The fingers 28 are designed to engage in grooves 29 in the panels 10. These grooves 29 may be formed directly in the edge members 15. However, it may be preferred to incorporate blocks 30 of metal, wood, or the like, in the panels 10 and to provide the grooves 29 in these blocks so as to space the grooves a greater distance from the margins of the panels and thus give the clamp means 20 a greater range of action and take-up. This permits the clamp to be used as a tie-down to the structure as well as a panel fastening means. The blocks 30 are preferably cemented to the skins 11 and to the inner faces of the adjacent marginal members 15 and the material of the laminations 14 may adhere to and partially embed the blocks, and if the blocks 30 are constructed of metal they may be riveted, bolted or welded in place. The above mentioned slots 27 in the panels 10 are of sufficient width to freely receive the arms 26 and their fingers 28 and to permit the fingers to be entirely received in the grooves 29. The width and gage of metal used in the clamps 24 are such as to give the clamps ample strength.

The panel securing clamp means 20 further includes screw-threaded means, or the equivalent, for actuating the clamps 24 to draw the panels 10 tightly together, to draw the panels against the flanges 23 of the frame member 21, and to secure the panels to the frame member. As illustrated in Figures 1 and 2 this means comprises a screw or bolt 31 for operating each pair of clamps 24. It is to be understood that where the clamps are of substantial width, where the panels 10 are of large size or where other factors of the installation dictate, two or more such bolts 31, or the equivalent, may be used with each pair of clamps 24. The bolt 31 is passed through an opening 32 in the frame member 21 and through openings 33 in the above mentioned clamp lugs 25 and, if desired, may be threaded in one or both of the openings 33. In the case illustrated, however, the bolt 31 has its head 34 engaging one lug and has a nut 35 cooperating with the other lug. The bolt 31 is of substantial length and the clamps 24 are proportioned so that their lugs 25 may be spaced a considerable distance from the sides of the frame member 21. As the bolt 31 is capable of axial movement in the opening 32, this relationship makes the clamp means "floating," that is, it permits the connection and attachment of the panels 10 one to the other and to the frame member 21 when the panels have their abutting margins either accurately aligned with the frame member 21 or offset considerable distances from either side of the frame member. This is an important feature as it materially facilitates the assembling and fabricating of structures such as buildings, etc. where more or less minor inaccuracies almost invariably occur.

It is believed that it will be apparent how two panels 10 may be arranged at the frame member 21 and positioned to have the tongue 16 entered in the groove 17 and how the clamps may be positioned at the frame member with the bolt 31 passed through the openings 32 and 33. The clamp arms 26 are readily engaged in the slots 27 to have their fingers 28 cooperate with the grooves 29. Upon tightening down the nut 35 the panels 10 are drawn up, that is they are forced toward one another, to seat the tongue 16 in the groove 17 and to compress the sealing beads 19 to a condition such as illustrated in Figure 2. Actuation of the nut 35 also draws the panels 10 against the flanges 23 of the frame member 21, the clamps 24 being designed not only to draw or clamp the panels one against the other at their edges but also to urge the panels inwardly against the flanges of the frame member. The bolt 31, engaged in the opening 32, of course ties the clamp 24 to the frame member and the clamps, in turn, secure the panels to the frame structure. The clamp and securing means 20 are preferably spaced along the panel joint to adequately connect and support the panels 10 and upon loosening or removing the nuts 35 the panels may be readily disassembled.

The above mentioned clamp means 22 is employed to join or connect panels 10 at regions remote from the frame members 21 or at points where there is no necessity for attaching the panels to a supporting structure. The means 22, as illustrated in Figure 3, includes a pair of clips or clamps 37 adapted to be arranged at one side of the panel assembly at a joint between two adjacent panels. These clamps 37 are similar or identical but are oppositely arranged. The bodies or main portions of the clamps may engage flatly against the faces of the panels 10 and the clamps have arms 38 adapted to extend into slots 39 formed in the panels 10. The slots 39 extend through the inner skins 11 and laminations 14. Inturned or lateral fingers 40 are provided at the extremities of the arms 38 to cooperate with grooves 41 in the edge members 15, the slots 39 being provided at the inner faces or sides of the members 15. The grooves 40 are preferably spaced substantially midway between the skins 11. The slots 39 are sufficiently wide to freely receive the arms 38 and to permit the introduction of the fingers 40 into the grooves 41. The clamps 37 are also provided with lateral ears or lugs 43 extending at substantially right angles from the panel assembly.

The clamp means 22 further includes a double-ended screw 44 threaded in openings 45 in the lugs 43. The screw 44 has a right hand thread screwed in one opening 45 and a left hand thread screwed in the other opening 45 and each end of the screw may have a polygonal portion engageable by a wrench or the like. The screw 44 is preferably of substantial length to provide for a large take-up or extensive drawing together of the panels 10. With the two adjacent panels 10 arranged in edge-to-edge relation such as illustrated in Figure 3 the arms 38 of the clamps are introduced into the slots 37 and the fingers 40 are engaged in the grooves 41. The screw 44 is then rotated to move or advance the clamps 37 toward one another. This draws the panels 10 together, compressing the seal beads 19 and tightly seating the tongue 16 in its groove 17. As illustrated in Figure 1 there may be several spaced clamp means 22 along the joint between two panels 10 and when the screws 44 of the several clamp means are operated as just described, the panels 10 are securely and positively connected together with the seals 18 properly engaged or actuated and with the tongue 16 tightly engaged in its groove 17 throughout its length. Upon backing off the screws 44 the clamp means 22 are released so that the panels 10 may be easily disassembled if desired or necessary.

Figure 4 illustrates another form of clamp means 22' which includes a clamp member 50 and a second clamp member 51. The member 50 may be a one-piece element having a lateral lug 52 corresponding, generally, to one of the lugs 43 described above, and also provided with an arm 53 and a finger 54 corresponding, generally, with the arm 38 and finger 39 of one of the clamp members 22. The clamp member 51 is a two-piece element having an outer part 55 adapted to engage against the panels 10 and an arm 56 riveted, welded, or otherwise secured to an outward portion of the part 55, the portions thus secured together constituting a double-thickness lug 57 opposing the lug 52 of the other clamp member 50. The arm 56 is provided at its other extremity with an inturned finger 58. The arms 53 and 56 are adapted to be introduced into the slots 39 in the panels 10 and the fingers 54 and 58 are adapted to cooperate with the grooves 41. The parts are constructed and related so that the portion 55 of the clamp member 51 engages against the surface of the panel assembly and the main web or portion of the clamp member 50 overlies the part 55. Thus the two clamp members mutually reinforce one another. The lugs 52 and 57 of the clamp members have openings 59 for receiving a screw or bolt 60. If a screw is employed it may be threaded in the opening 59 of the double thickness lug 57 and its head may cooperate with the lug 52. In the particular case illustrated there is a bolt 60 provided with a nut 61. When the nut 61 on the bolt 60 is tightened down, the clamp members 50 and 51 are moved toward one another to draw the panels 10 together. As in the other form of the invention this compresses the seal beads 19 and firmly engages the tongue 16 in the groove 17. Where a plurality of these clamp means is spaced along a panel joint the panels are dependably joined and sealed together. It will be observed that with this structure the lugs 52 and 57 are offset from the joint between the two panels and the clamp means is especially rigid. As in the other forms of clamp means of the invention the panels may be easily and quickly disassembled if necessary.

Figure 5 illustrates a clamp means of the invention as employed to secure together two panels 10 arranged at substantially right angles to one another. In this case, the edge member 15 of one panel 10 is arranged against the inner skin 11 of the adjacent panel along the margin of the same. A sealing strip 18' is secured in a slot in this adjacent panel and its bead 19' is received and compressed in the groove 17 of the edge member 15. The panel 10 carrying the sealing strip 18' has a special edge member 15' of metal, wood, or the like, which may present a plain exposed surface substantially flush with the external skin 11 of the adjacent panel. A recess 63 is formed at the inner side of the edge member 15', extending through the inner skin 11 of the panel and into the assembly of filler strips 13. A slot 64 extends longitudinally outward from this recess 63, the edge member 15' being shaped so that it presents a surface forming one wall of this slot. A groove 65 is formed in this surface of the member 15' to communicate with the slot 64 and to be aligned with the groove 41 in the member 15 of the other panel. This other panel 10 has a slot 39 corresponding with the above described slots. Clamp members, which may be substantially the same as the clamp members illustrated in Figure 3 and described above, are arranged so that the arm 38 of one member extends into the slot 64 to have its finger 40 engaged in the groove 65 and so that the arm 38 of the other member extends through the slot 39 to have its finger 40 engage in the groove 41. The recess 63 is sufficiently large to permit this positioning of the clamp members. A screw 44, such as illustrated in Figure 3, may be employed to actuate the clamp members 37 although in the specific arrangement illustrated a bolt 66 has been substituted for the screw 44 and passes through the openings 45' in the lugs 43 of the clamp members. When the nut 67 on the bolt 66 is tightened down, the edge members 15 and 15' are tightly drawn together, compressing the seal bead 19 against the wall of the groove 17 to provide a seal between the panels. It is preferred to make the recess 63 sufficiently large to provide free access to the head of the bolt 66 or the nut 67, as the case may be, so that the nut and the bolt may be conveniently tightened down to actuate the clamps 37. In an arrangement such as illustrated in Figure 5, there may be several pairs of clamp members 37 positioned at spaced points along the joint and arranged, as illustrated, to evenly draw the two panels together in the angular relation.

Figures 6 and 7 illustrate a form of the invention characterized by a one-piece spring clip type clamp means. When this type of panel securing means is employed, the edge members 150 of the panels are provided with a tongue and groove combination 160 and 170 substantially the same as the tongue and groove 16 and 17 described above, or with any other selected form of lapped surface engagement. One member 150 carries the sealing strips 18 for sealing between the opposing edge members. Slots or recesses 70 are formed in the panels 10 to extend through the inner skins 11 and laminations 14 with the adjacent edge members 150 presenting the inner side walls of the recesses. These surfaces 71 of the members 150 are pitched or inclined, the inclination being such that the surfaces 71 diverge outwardly toward the inner skins 11 of the panels, assuming the panels to be in the edge-to-edge relation illustrated in Figures 6 and 7. Grooves 72 are provided in the members 150 at the inner edges of the surfaces 71 to receive elements of the clamp or clip. The clamp or clip has a main web 73 which may normally be substantially flat and which is adapted to lie adjacent or against the faces of the assembled panels 10. Arms 74 extend from the opposite ends of the web 73 and the extremities of the arms have fingers 75 projecting inwardly or toward one another. The fingers 75 are bent or shaped to incline from the arms 74 being inwardly divergent to cooperate with the walls of the grooves 72 which are correspondingly pitched or inclined. The grooves 72 are preferably in a plane substantially midway between the skins 11 of the panels and the clip is proportioned so that the fingers 75 are capable of tightly engaging in the grooves when the web 73 is against or immediately adjacent the inner skins 11 of the panels. The clamp or clip is formed of spring steel, or the like, to have considerable resiliency and is proportioned so that the space between the two fingers 75 is initially materially less than the space between the surfaces 71, assuming the two panels 10 to be in the adjacent edge-to-edge position, illustrated in Figure 6.

In employing the panel securing means illustrated in Figures 6 and 7, the two panels 10 are brought to the edge-to-edge relationship illustrated in Figure 6 with the tongue 160 entering the groove 170 and with the sealing beads 19 engaged with the opposing edge member 150. The clamp or clip is then brought to a position at the inner side of the assembly, such as illustrated in the broken lines in Figure 6, and its arms 74 are spread so that the fingers 75 engage on the surfaces 71. In practice, one finger 75 may first be engaged on a surface 71 and the clip may then be sprung slightly to engage the other finger 75 on its surface 71. The clamp or clip is then forced or driven inwardly so that the fingers 75 ride inwardly along the surfaces 71. This may be accomplished by sustained pressure or by arranging a block of wood, or the like, against the clip and then striking it with a hammer or mallet. The clamp or clip is driven or forced inwardly until the fingers 75 snap into the grooves 72. The forcing or driving of the fingers 75 along the surfaces 71 draws the panels 10 together, tightly seating the tongue 160 in the groove 170 and compressing the sealing beads 19. The sprung or expanded clip is such that a considerable force or pressure is exerted by the fingers 75 when the latter are engaged in the grooves 72 and this pressure effectively maintains the panels 10 in the assembled positions. It is to be understood that a plurality of spaced clips or clamps of the kind illustrated may be spaced along a given panel joint to assure a secure positive connection between the panels. If it subsequently becomes desirable or necessary to disconnect the panels 10, a suitable tool is engaged under the webs 73 of the several connecting clips and the clips are sprung or forced outwardly to disengage their fingers 75 from the grooves 72 and to withdraw the arms 74 from the slots 70.

Figure 8 illustrates a cam actuated clamp means of the invention for securing adjacent panels 10 one to the other. Where this type of panel securing means is employed the panels 10 and their edge members 15 may be the same as illustrated in Figures 3 and 4 and corresponding reference numerals are employed. This embodiment of the invention includes a one-piece clamp 80 of spring steel, or the like. The outer portion of the clamp 80 is substantially U shaped, having two spaced side parts 81 connected by a curved web 82. The side parts 81 flare or diverge toward the assembled panels 10 and have substantially straight arms 82 at their outer ends. Inturned fingers 83 are provided on the extremities of the arms 82 for cooperating with the grooves 41. A strap 84 is riveted or otherwise secured to one side part 81 and extends laterally beyond the other side part 81. A transverse shaft or pin 85 is carried by the strap 84 and a cam 86 is rotatable on the pin. The cam 86 has a projecting handle 87 to facilitate its manual operation. The cam 86 may be substantially square or rectangular with appropriately rounded corners and is eccentrically mounted on the pin 85 to have one surface 88 more remote from its axis of rotation than its adjacent surface 89. As illustrated in Figure 8, the cam 86 is mounted and arranged adjacent a side part 81 of the clamp and is turnable from the broken line position where its surface 89 engages the adjacent side part 81 to the full line position where its surface 88 bears against the side part.

In employing the securing means of Figure 8, the panels 10 are first assembled in adjacent edge-to-edge relation where the tongue 16 enters the groove 17 and the clamp 80 is arranged at the joint with the cam 86 in the position where its surface 89 is at or against the adjacent side part 81. With the clamp in this condition the arms 82 may be readily entered through the slots 39 to bring the fingers 83 into the grooves 41, it being understood that it may be necessary to flex or spring the clamp to some extent to engage the fingers 83 in the grooves 41. With the clamp in position the cam 86 is turned to the full line position of Figure 8 where the surface 88 presses inwardly against the adjacent side part 81. This actuates the arms 82 inwardly or toward one another and thus draws the two panels 10 together to seat the tongue 16 in the groove 17 and to compress the sealing beads 19. This actuation of the cam 86 also holds the fingers 83 in the grooves 41 and urges the fingers against the walls of the groove to assure a dependable connection between the panels. It is to be observed that when the cam 86 is operated between the broken line position and the full line position of Figure 8, its corner 90 rides on the adjacent side part 81 to exert a considerable force on the cam to draw the panels 10 together and when this corner 90 moves clear of the side part 81 the surface 88 is moved into flat engagement with the side part to retain the cam in its actuated position. Several of these clamps may be employed at spaced points along the joint between the panels to assure a positive connection between the panels. If it becomes necessary to disconnect the panels the cam 86 is turned to the broken line position of Figure 8 and the clamp 80 is sprung to disengage the fingers 83 from the grooves 41 whereupon the arms 82 may be withdrawn from the slots 39. This type of clamp is advantageous in that it is quick-acting.

From the foregoing it will be seen that I have provided panel assemblies incorporating simple, inexpensive, and yet very effective means for drawing the panels together and for dependably and securely connecting the panels. In each of the several embodiments the panels themselves have interfitting or lapped engagement at the tongues 16 and grooves 17 and these lapped parts, or their equivalent, are maintained in positive engagement by the clip or clamp means so as to dependably assume transverse shear loads on the joints. The clip or clamp means, such as illustrated in Figures 3 to 8 inclusive, are effective in urging or drawing the panels 10 together to assume this lapped engagement and to maintain the interfitting or lapped relationship. The clamp means also compress or actuate the sealing beads 19 and maintain them in the condition where they are pressed between the edge members 15 to preserve fluid-tight seals. It is to be observed that the panel connecting and securing means have no elements whatsoever extending completely through the walls of the panels, there being no parts of the clip or clamp means exposed at the outer surfaces of the panels to transfer heat from the interior of the structure to its exterior, and the outer skins 11 and insulating laminations 14 are uninterrupted and imperforate. This adapts the construction for use in the arctic regions, and the like, where the transmission of heat through panel joints has been a difficult problem. In the structure of Figure 2, the clamp means of the invention not only draws the panels 10 together and holds them together with the tongue and groove 16 and 17 tightly engaged and the seals 19 actuated or compressed, but also urges the panels against the supporting frame members 21 and dependably secures the panel assembly to the frame, all as above described. The assemblies of the invention are easily and quickly installed without special tools or equipment or skilled workmen and are such that the panels may be readily disconnected or disassembled when desired. The clamp or clip means are capable of repeated reuse and in any given installation identical clamp means may be employed throughout, if desired, to reduce the cost and to simplify the installation.

Having described only typical forms of the invention I do not wish to be limited to the specific details herein set forth, but wish to reserve to myself any variatious or modifications that may appear to those skilled in the art and fall within the scope of the following claims.

I claim:

1. Means for joining two panel-like building elements having opposing edges and each having an opening in one side adjacent said edges and a groove in the wall of the opening, said means including a spring clamp having arms sprung into said openings, and fingers on the arms engaged in said grooves.

2. Means for joining two panel-like building elements having opposing edges and each having an opening in one side adjacent said edges and a groove in the wall of the opening, said means including a U shaped spring clamp having arms sprung into said openings and fingers on the arms cooperating with said grooves, and cam means for urging said arms toward one another.

3. In an assembly of the character described, a frame part having an opening, a pair of panels having opposing edges adjacent the frame part and each having an opening adjacent its edge, a pair of clamp members at one side of the panels, arms on the members engaged in said openings of the panels, and screw threaded means engaged through said opening in the frame member and connecting said members to tie the members and panels to the frame part and for drawing said edges of the panels together.

4. In an assembly of the character described, a frame part having an opening, a pair of panels having opposing edges adjacent the frame part and each having an opening adjacent its edge, a pair of clamp members at one side of the panels, arms on the members engaged in said openings of the panels, lugs on the members having openings aligned with the opening in the frame part, and a screw threaded member engaged through the openings of the lugs and part to secure the members and panel to the frame part and operable to draw said edges together.

5. A panel assembly for use with a frame part having an opening comprising a pair of panels having opposing edges provided with overlapping edges, there being openings in the panels adjacent said edges and grooves in the walls of the openings, a clamp member at each side of the frame part, each clamp member having an arm entering an opening in a panel, a finger on each arm cooperating with a groove, a lug on each clamp member having an opening aligned with said opening in the frame part, and screw-thread means passing through the openings in the frame part and lug to secure the panels to the frame part and operable to move the clamp members toward one another to draw the panels together and hold said overlapping edges in engagement.

6. Means for joining two panel-like building elements having opposing edges and each having an opening in one side adjacent said edges and a groove in the wall of the opening extending toward said edges, said means including two clamp members at said sides of the elements, arms on the clamp members extending into said openings from said sides of the elements and movable in said openings toward said edges, fingers projecting from the arms toward said edges and proportioned to pass through said openings and movable with said members to positions to engage in said grooves and means connecting said members and urging said arms toward one another to lock said fingers in said grooves and to press said arms against the walls of said openings to draw said edges of the elements together.

7. Means for joining two panel-like building elements having opposing edges and each having an opening in one side adjacent said edges and a groove in the wall of the opening extending toward said edges, said means including two clamp members at said sides of the elements, arms on the members extending into said openings from said sides of the elements, the width of said openings being greater than the thickness of the arms whereby the arms are movable in the openings toward said edges, fingers projecting from the arms toward said edges and movable with the arms to cooperate with said grooves, outwardly projecting lugs on the members, and a bolt engaged with the lugs for moving the members toward said edges to lock said fingers in said grooves and to press said arms against the walls of said openings to draw said edges of the elements together.

8. Means for joining two panel-like building elements having opposing edges and each having an opening in one side adjacent said edges and a groove in the wall of the opening extending toward said edges, said means including two clamp members at said sides of the elements, arms on the members extending in said openings from said sides of the elements the width of said openings being greater than the thickness of the arms whereby the arms are movable in the openings toward said edges, fingers on the arms projecting toward said edges and movable with the arms to engage in said grooves, outwardly projecting lugs on the members, the lugs having openings, and a screw threaded in the openings in the lugs to move members toward said edges and thereby force the fingers into said grooves and press the arms against the walls of the openings to draw the edges of the elements together.

9. A pair of panels having opposing edges, a groove in one of said edges and a tongue on the other edge for engagement in the groove, at least one compressible sealing strip between the edges, the panels having openings in corresponding sides and a depression in a wall of each opening extending toward said edges, and means for securing the panels together comprising a clamp at said corresponding sides of the panels having arms extending into said openings from said sides of the panels, fingers projecting from the arms toward said edges to extend into said depressions, and means for actuating the clamp to move said arms toward one another to lock the fingers in said depressions and to force the arms against the walls of the openings and thus draw said edges together and to compress said strip.

References Cited in the file of this patent

UNITED STATES PATENTS

| | | |
|---|---|---|
| 1,226,419 | Turner | May 15, 1917 |
| 1,397,976 | McAvoy et al. | Nov. 22, 1921 |
| 1,503,622 | Bachmann | Aug. 5, 1924 |
| 1,529,709 | Neumann | Mar. 17, 1925 |
| 1,602,658 | Germain | Oct. 12, 1926 |
| 2,092,552 | Larrick | Sept. 7, 1937 |
| 2,137,767 | Betcone | Nov. 22, 1938 |
| 2,140,772 | Slayter et al. | Dec. 20, 1938 |
| 2,260,105 | Hasenburger et al. | Oct. 21, 1941 |
| 2,278,956 | Wagner | Apr. 7, 1942 |
| 2,358,022 | Mullen | Sept. 12, 1944 |
| 2,540,468 | Anderson | Feb. 6, 1951 |

FOREIGN PATENTS

| | | |
|---|---|---|
| 38,487 | Norway | Dec. 3, 1923 |
| 665,387 | Germany | Sept. 23, 1938 |